Nov. 18, 1958     M. FRITZ     2,860,527
CONNECTING RODS FOR INTERNAL COMBUSTION ENGINES
PARTICULARLY HIGH-SPEED AUTOMOBILE ENGINES
Filed Dec. 16, 1952     2 Sheets-Sheet 1
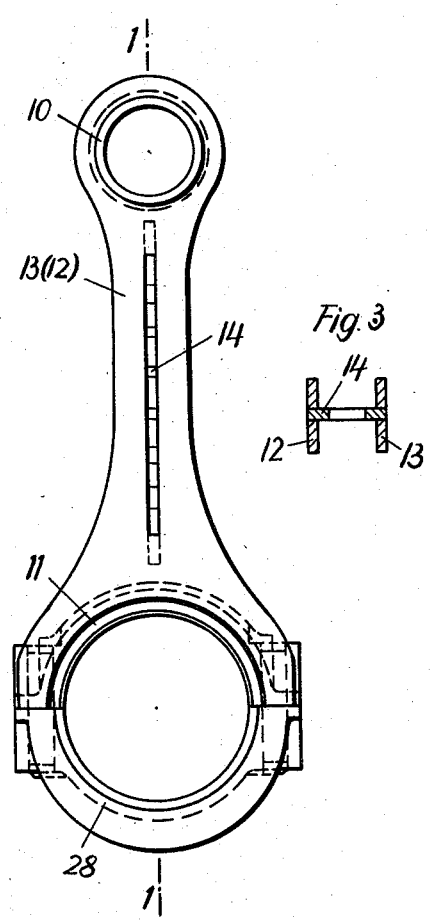
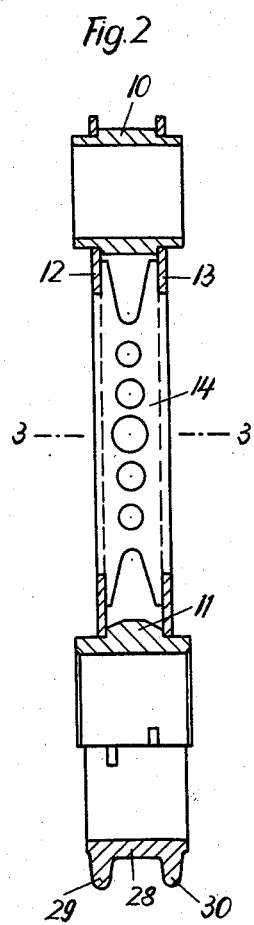
Inventor
Martin Fritz
By Dicke and Padlar
Attorneys Nov. 18, 1958  M. FRITZ  2,860,527
CONNECTING RODS FOR INTERNAL COMBUSTION ENGINES
PARTICULARLY HIGH-SPEED AUTOMOBILE ENGINES
Filed Dec. 16, 1952                               2 Sheets-Sheet 2
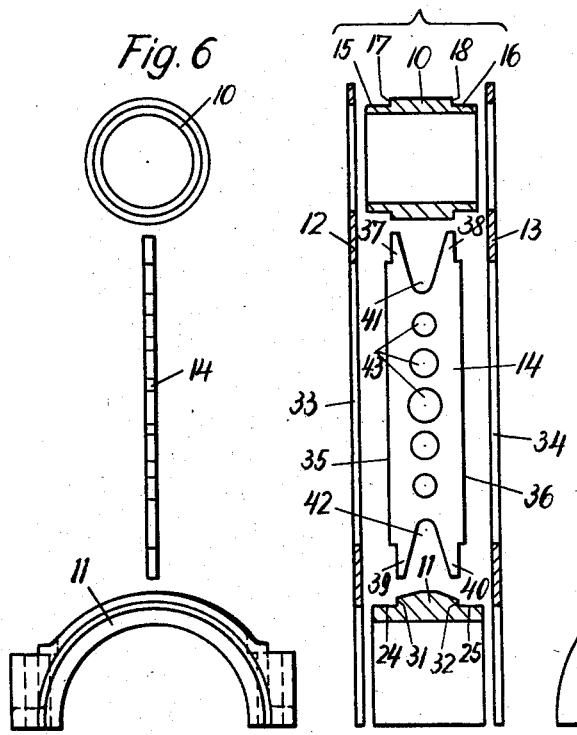
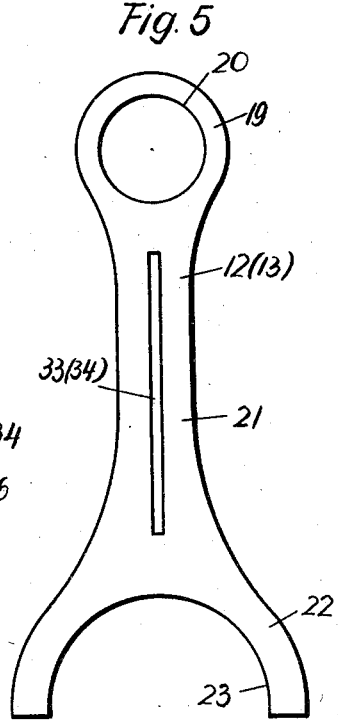
Inventor
Martin Fritz
By Hicke and Padlon
Attorneys United States Patent Office 2,860,527
Patented Nov. 18, 1958

2,860,527

CONNECTING RODS FOR INTERNAL COMBUSTION ENGINES PARTICULARLY HIGH-SPEED AUTOMOBILE ENGINES

Martin Fritz, Ditzingen, Kreis Leonberg, Germany, assignor to Daimler-Benz Aktiengesellschaft, Stuttgart-Unterturkheim, Germany Application December 16, 1952, Serial No. 326,221

Claims priority, application Germany December 17, 1951

10 Claims. (Cl. 74—588)

The present invention relates to connecting rods for use in internal combustion engines, particularly in high-speed automobile engines.

In high-speed internal combustion engines, particularly in automobile engines, the weight of the connecting rods is of practical importance for the load on the big end and the crankshaft bearings.

An object of the invention is to provide a connecting rod whose weight is as low as possible and which, nevertheless, has a high inherent strength.

Another object of the present invention is the provision of a simplified and cheaper method of manufacturing of connecting rods.

A further object of the present invention is to provide a connecting rod suitably formed for transmitting power.

The present invention substantially consists in a built-up connecting rod whose members made of forged or rolled material are rigidly joined with one another after assembling. Particular features of the connecting rod according to the present invention are embodied in the middle section between the small and the big ends of the connecting rod which are made of rolled or flat steel, and by the small and the big ends which are produced of tube blanks or forged pieces. A particular advantage results in manufacturing the small end of the connecting rod on an automatic lathe and the big end as a forging piece. The members made of flat steel are preferably joined with one another, for instance, with the members of the connecting rod made of rolled or flat steel, the said members being provided with long contacting edges and appropriately also with side supports. The middle section may consist of 3 members of flat steel which members form an I-section when assembled. The web plate is provided with rail-like projections fitting in the longitudinal slots of the side members of the middle section, and with shoulders permitting an accurate fixing of the side members so that a symmetric assembly of the connecting rod is given.

In contrast to the drop-forged connecting rods hitherto used the connecting rod produced according to the invention may favorably be formed for transmitting power in such a way that the web plate of the middle section is arranged in the plane defined by the axes of the small and the big ends of the connecting rod and the side members of the middle section are disposed perpendicularly to the web plate. These side members appropriately enclose the ends of the connecting rod in an annular or fork-like manner by means of centering inside surfaces, and are supported axially against shoulder surfaces provided at the ends of the connecting rod.

The rigid joining of the individual members of the assembled connecting rod is caused by a gas-shielded brazing. The connecting rods may be made of steel or light metal. When necessary the one or the other member, for instance, the ends of the connecting rod, may consist of cast material.

Further objects, features and advantages of the present invention will become more obvious from the following description when taken in connection with the accompanying drawing which shows for purposes of illustration only one preferred embodiment in accordance with the present invention, and wherein:

Fig. 1 is a side view of the finished connecting rod according to the present invention, Fig. 2 is a longitudinal section along line 1—1 in Fig. 1, Fig. 3 is a cross section along line 3—3 in Fig. 2, Fig. 4 is a longitudinal section through the connecting rod shown in Fig. 2 in an exploded illustration, Fig. 5 is a side view of the side members of the connecting rod, Fig. 6 is a side view of the web plate and of the big and small ends of the connecting rod according to the invention, and Fig. 7 is a plan view of the big end bearing of the connecting rod.

Referring now to the drawing, and more particularly to Fig. 4 the connecting rod according to the invention consists of the small sleeve 10, the big end bearing half 11, the two side members 12 and 13 connecting the big and small ends of the connecting rod, and the reinforcing web plate 14. The small end sleeve 10 will appropriately be made of a tube on an automatic lathe, the steps 15 and 16 being machined separately from the faces and the bore of the small end sleeve. The shoulders 17 and 18 serve as stops for the side members 12 and 13 centered on the steps 15 and 16. The side members 12 and 13 consist of the annular section 19 with a bore 20, the diameter of which corresponds to that of the steps 15 and 16, of the middle section 21, and of the forked section 22 whose inside diameter 23 corresponds to the steps 24 and 25 of the big end bearing half. The member 11 is appropriately swaged in a finishing die. This member has holes 26 and 27 to receive the bolts for fastening the big end cap 28 of the connecting rod (Fig. 1), which cap may be swaged or produced as a casting provided with peripheral ribs 29 and 30.

The steps 24 and 25 are again limited by stop surfaces 31 and 32 for the side members 12 and 13 (see Figs. 4, 2).

The two side members 12 and 13 are furthermore supported against each other by the web plate 14. For that purpose the side members are provided with slots 33 and 34 in which the rail-like parts 35, 36 projecting along the longitudinal edges of the web plate 14 engage, which edges have the same length as the slots, the side members abutting against the tongues 37, 38 and 39, 40 which act as stops therefor. For reducing the weight the web plate is furthermore provided with recesses 41, 42 and holes 43.

The assembly is done in such a way that the side members 12 and 13 are placed on the steps 15, 16 and 24, 25 of the ends of the connecting rod from the outside thereof, the web plate 14 being simultaneously inserted into the slots 33 and 34 of the side members by means of its rail-like projecting longitudinal edges 35, 36. In this way the position of the side members is exactly defined by the stops 17, 37, 39, 31, and 18, 38, 40, and 32. After thus assembling the members they are thereupon brazed with one another under the use of a protecting or shielding gas. As will be seen, the individual members have a relatively long edge or surface contact with one another so that a reliable and solid joining of the members is obtained.

What I claim is:

1. Light-weight connecting rod made of a plurality of individual parts comprising a tubular bearing member for the piston pin, a semi-circular bearing member for the crank pin, and means for connecting said bearing members with the axes thereof in parallel spaced relationship, said means including two side members provided at one end thereof with a bore corresponding to the circumferential dimension of said tubular bearing member and at the other end thereof with a semi-circular recess corresponding to the circumferential dimension of said semi-circular bearing member, said side members being mounted over said bearing members and fastened thereto near the ends thereof in a plane perpendicular to the axes thereof so as to extend in a radial direction with respect to said bearing members and connect the same, a web member in the plane of said axes between said side members, said web member including projecting portions shorter than said web member along the longitudinal edges thereof, and longitudinal slots in said side members to receive said projecting portions and to thereby secure said web member against said side members.

2. Connecting rod according to claim 1, wherein said tubular bearing member is made of a machined tube blank, said semi-circular bearing member is made as a forging, and said side members and said web are made of flat steel.

3. Connecting rod according to claim 1, wherein said web member is provided with recesses to reduce the weight thereof and includes stop shoulders for said side members slipped on said web member from the outside thereof.

4. Connecting rod according to claim 1, further comprising shoulder-like stop surfaces for said side members provided on said bearing members along the sides thereof facing said side members.

5. Connecting rod according to claim 1, wherein said semi-circular bearing member is closed by a cap which is forged separately and provided with reinforcing ribs.

6. Connecting rod according to claim 1, wherein the individual parts of said connecting rod are brazed to each other under use of a protecting gas.

7. Light-weight connecting rod made of a plurality of individual parts comprising a tubular bearing member, a semi-circular bearing, and means for connecting said bearing members with the axes thereof in parallel spaced relationship, said means including two side members provided at one end thereof with a bore corresponding to the circumferential dimension of said tubular bearing member and at the other end thereof with a semi-circular bearing member, shoulder-like stop surfaces for said side members provided on said bearing members near the ends thereof along the sides facing said side members, said side members being mounted over said bearing members and fastened thereto at said stop surfaces in a plane perpendicular to the axes thereof so as to extend in a radial direction with respect to said bearing members, a web member in the plane of said axes located between said side members and provided with holes to reduce the weight thereof, said web member including projecting portions shorter than said web member along the longitudinal edges thereof, and longitudinal slots in said side members to receive said projecting portions and to thereby secure said web member against said side members, said web member having a stop shoulder for said side members slipped on said web member from the outside thereof.

8. Connecting rod according to claim 7 wherein said web member is shorter than the space separating said bearing members.

9. Connecting rod made of a plurality of parts comprising a first bearing member, a second bearing member parallel to said first bearing member, said bearing members being provided with shoulder-like stop surfaces, two side members extending perpendicularly with respect to the axes of said bearing members and fastened to said shoulder-like stop surfaces of said bearing members, a web member substantially perpedicular to said side members, and means for connecting said web member to said side members intermediate said bearing members.

10. Connecting rod comprising a bearing cup, a bearing sleeve parallel to said bearing sup, said bearing cup and said bearing sleeve being provided with shoulder-like stop surfaces, two side members extending substantially perpendicularly to the axes of said bearing cup and said bearing sleeve and abutting at one end thereof against the stop surfaces of said bearing sleeve and at the other end thereof against the stop surfaces of said bearing cup to connect said bearing cup and said bearing sleeve, and a web member substantially perpendicular to said side members, and means of said web member projecting into said side members for connecting said web member to said side members intermediate said bearing cup and said bearing sleeve.

References Cited in the file of this patent

UNITED STATES PATENTS

| | | |
|---|---|---|
| 1,380,659 | Layman | June 7, 1921 |
| 1,418,084 | Layman | May 30, 1922 |
| 1,444,471 | Layman | Feb. 6, 1923 |
| 1,496,365 | Bouvier | June 3, 1924 |
| 2,533,822 | Lee | Dec. 12, 1950 |
| 2,644,344 | Musschoot | July 7, 1953 |